US012056649B2

(12) United States Patent
Dhawan et al.

(10) Patent No.: US 12,056,649 B2
(45) Date of Patent: Aug. 6, 2024

(54) SYSTEM AND METHOD TO FORMULATE EFFECTIVE ENERGY BREAKS IN A CONTACT CENTER

(71) Applicant: NICE LTD, Ra'anana (IL)

(72) Inventors: Salil Dhawan, Maharashtra (IN); Chaitra Date, Maharashtra (IN); Ashadeepa Debnath, Maharashtra (IN)

(73) Assignee: NICE LTD., Ra'anana (IL)

( * ) Notice: Subject to any disclaimer, the term of this patent is extended or adjusted under 35 U.S.C. 154(b) by 117 days.

(21) Appl. No.: 17/141,238

(22) Filed: Jan. 5, 2021

(65) Prior Publication Data
US 2022/0215321 A1    Jul. 7, 2022

(51) Int. Cl.
*G06Q 10/0639* (2023.01)
*G06N 20/00* (2019.01)
*H04M 3/51* (2006.01)

(52) U.S. Cl.
CPC ....... *G06Q 10/06398* (2013.01); *G06N 20/00* (2019.01); *G06Q 10/06393* (2013.01);
(Continued)

(58) Field of Classification Search
CPC ....... G06Q 10/06398; G06Q 10/06393; G06N 20/00; H04M 3/5175; H04M 2203/402; H04M 2203/558
(Continued)

(56) References Cited

U.S. PATENT DOCUMENTS 9,348,480 B1 * 5/2016 Chau ................. G06F 3/048
2015/0170093 A1 * 6/2015 Czachor, Jr. ... G06Q 10/063116
705/7.16
(Continued)

OTHER PUBLICATIONS

"A personalized time activity Recommendation System" Mittal et al. Mar. 2, 2017 (Year: 2017).*
(Continued)

*Primary Examiner* — Charles Guiliano
*Assistant Examiner* — Po Han Lee
(74) *Attorney, Agent, or Firm* — SOROKER AGMON NORDMAN RIBA

(57) ABSTRACT

A computerized-method for recommending activities for an agent, in a contact center is provided herein. The computerized-method includes operating an activities-recommendation module, for agents in a contact center, during a work-shift of an agent. The operating of the activities-recommendation module includes: (i) operating a machine-learning-model to calculate a motivation-score; (ii) associating a preconfigured score-range for the calculated motivation score; (iii) collecting activities which were pre-assigned to the preconfigured score-range; (iv) retrieving one or more predetermined agent favorite activities; (v) retrieving one or more agent history activities, which were previously selected by the agent; (vi) calculating an activity-occurrence score for each activity of the collected activities, which were preassigned to the preconfigured score-range, by adding the: (a) motivation-score; (b) the one or more predetermined agent favorite activities; and (c) the one or more agent history activities; and (vii) displaying a rated list of recommended activities, according to the calculated activity-occurrence score.

18 Claims, 9 Drawing Sheets

(52) U.S. Cl.
CPC .... *H04M 3/5175* (2013.01); *H04M 2203/401* (2013.01); *H04M 2203/402* (2013.01); *H04M 2203/558* (2013.01)

(58) Field of Classification Search
USPC ........................................................ 705/7.42
See application file for complete search history.

(56) References Cited

U.S. PATENT DOCUMENTS

| | | | |
|---|---|---|---|
| 2015/0364057 A1* | 12/2015 | Catani | G16H 10/60 |
| | | | 434/262 |
| 2018/0034966 A1* | 2/2018 | te Booij | H04M 3/5232 |
| 2018/0095429 A1* | 4/2018 | Weinstein | G06Q 10/109 |
| 2019/0272466 A1* | 9/2019 | Margolin | G06N 3/08 |
| 2020/0252510 A1* | 8/2020 | Ghuge | G10L 15/187 |
| 2020/0367807 A1* | 11/2020 | Lassoued | G16H 20/70 |
| 2021/0086089 A1* | 3/2021 | Pardeshi | G06N 3/02 |

OTHER PUBLICATIONS

"A personalized time-bound activity Recommendation System" Mittal et al. Mar. 2, 2017 (Year: 2017).*

* cited by examiner

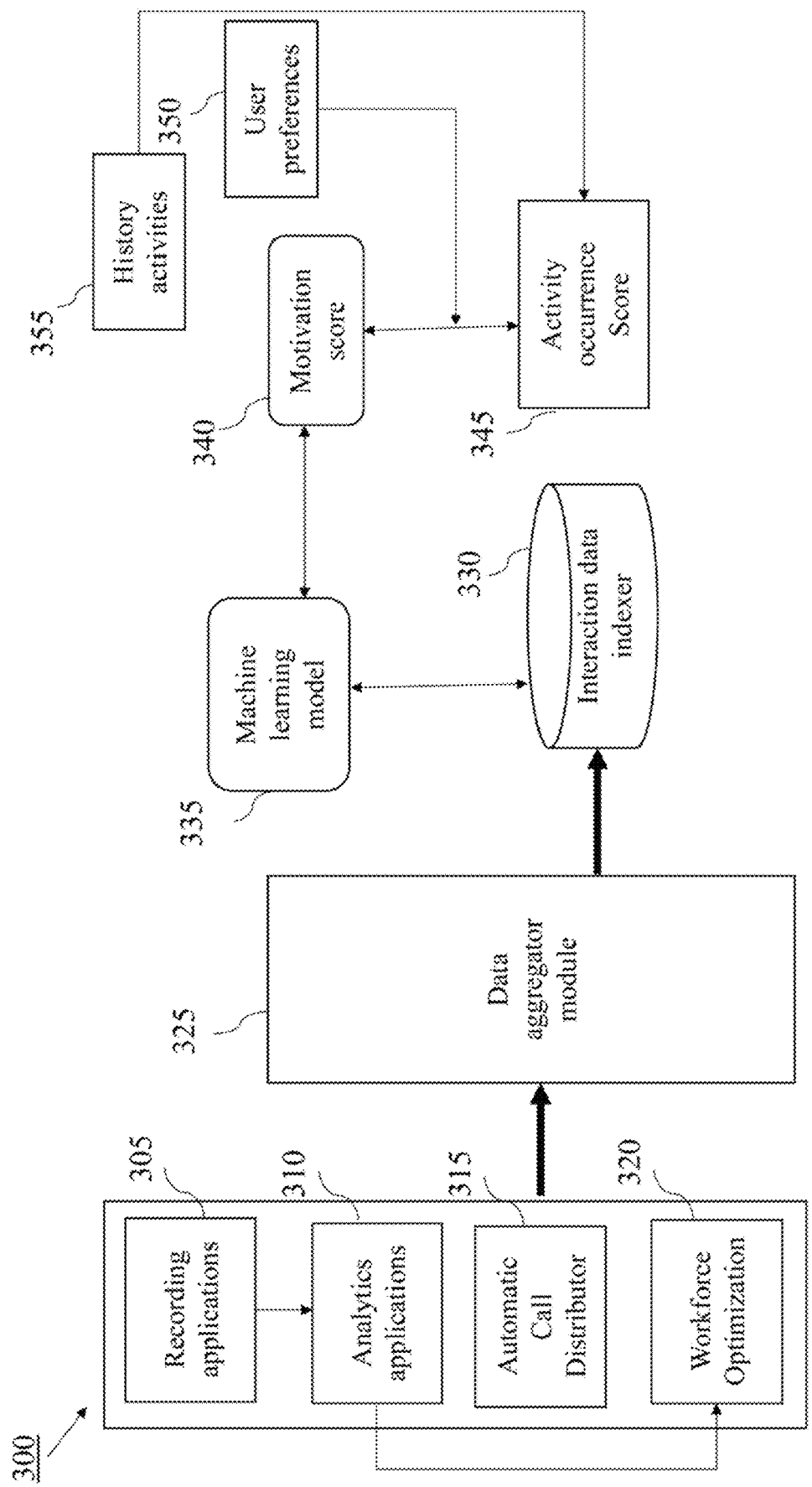

| Recommended Activities Selection Rules | Desk Stretching | Dance Fitness | Ergonomics | Motivational stories | Standup Comedy | News in shorts | Short stories | Comic Strips | Meditation |
|---|---|---|---|---|---|---|---|---|---|
| Motivation Score (MS) | 1x | 1x | 1x | 1x | 1x | 1x | 1x | 1x | |
| User Favorites (UF) | | 2x | | | 2x | | | | 2x |
| User History (UH) | 1x | 1x | | | | | | 1x | |
| Occurrence Score (MS + 2 UF + UH) | 1 | 4 | 1 | 1 | 3 | 1 | 1 | 2 | 2 |

Figure 6

SYSTEM AND METHOD TO FORMULATE EFFECTIVE ENERGY BREAKS IN A CONTACT CENTER

TECHNICAL FIELD

The present disclosure relates to the field of data analysis for formulating energy breaks in a contact center.

BACKGROUND

Customer satisfaction is most significant for contact centers. One factor that may influence customer satisfaction measurement may be the level of engagement and motivation of the agents. The level of engagement and motivation may be impaired by stress and anxiety, which are common, given the nature of work in the contact center and may have a negative impact on the well-being of the agent. Low level of engagement and motivation of the agents may have a direct impact on the effectiveness of the contact center and the success of the related company. Due to circumstances which required 'Work from Home', many agents have found themselves in a stressful situation due to the difficulties to manage work and home balance, given the remote working dynamics.

Remote working has put many agents under a lot more stress and discomfort, which may be also as a result of lack of ergonomic office features, such as, comfortable seating and working conditions, appropriate time management and taking uninterrupted customer calls and appropriate time breaks. Appropriate time breaks may have a positive effect on the agents' performance and productivity.

It is therefore imperative that contact center management recognizes sources of agents' stress and anxiety and accordingly, may take corrective steps towards combating it. Providing agents with opportunities to take meaningful breaks will allow them to re-energize and it may improve agent productivity and job satisfaction. Often, the agents are constantly engaged with the customers and forget to take necessary breaks, which are important to maintain healthy mind and body and thus to remain productive.

Moreover, contact center agents are increasingly bound by inflexible shifts-systems which is a condition that is conducive to stress and burnout. When employees feel disconnected and disengaged, it leads to declining of their performance, risking the company reputation, and to a negative impact on customer satisfaction. In a situation of an increase in the number of calls, the agents are expected to deal with emotionally charged customers, which causes immense amounts of stress and leads to the agents' burnout which makes it impossible for the agents to remain empathic to the clients.

One of the most immediate and easily achievable corrective action required to be taken in the context of remote working for contact centers is to make sure that agents are encouraged to take most appropriate breaks and provide them with opportunities to utilize the available breaktime efficiently.

This can be done by providing them options to get involved in relevant relaxing and recreational activities during breaktime, which can be of maximum benefit to them. With this approach, agents will consequently be more productive when helping customers during their scheduled working hours, thus elevating customer service experience.

Stress levels within the contact center working conditions, may have a significant impact on the agents and the contact center. When stressors within the contact center become significant, they result in decreased productivity, job satisfaction and health, all of which have a major impact on the contact center. It is therefore important to allow agents to take relevant breaks when their stress level increases. Providing agents with flexibility to choose from most relevant types of activity during the breaks, may empower them with a greater sense of control over their experience of stress and may increase their productivity.

It is important for agents in a contact center to get involved in relaxing and recreational activities. Adequate and meaningful breaktime activities may help to maintain flexibility and agility for agents and may improve their morale and increase agents' productivity.

Accordingly, there is a need for a technical solution, such as an application, that will help the agents to customize their break routine activities and make the agents look forward to the next energy break activity by formulating effective energy breaks for each agent, during work-shifts in the contact center.

Such a technical solution may also guard agents from the risk of social isolation while in remote working mode. The technical solution may help to prevent mental health issues that might emerge a few weeks down the line and will be of huge benefit contributing towards creating better working environment during remote working, for the contact center agents.

Therefore, to improve operational efficiency and customer experience, it may be essential for a contact center to implement a computerized-method and a computerized system for recommending breaktime activities for an agent, in a contact center.

SUMMARY

There is thus provided, in accordance with some embodiments of the present disclosure, a computerized-method for recommending activities for an agent, in a contact center.

Furthermore, in accordance with some embodiments of the present disclosure, in a computerized system that is comprising a processor, a database of interactions data indexer; and a database of user preferences; and a memory to store the plurality of databases, said processor is configured to operate an activities recommendation module, for one or more agents in a contact center, during a work-shift of an agent.

Furthermore, in accordance with some embodiments of the present disclosure, the operating of the activities recommendation module may include: (i) operating a machine learning model to calculate a motivation score based on aggregated data by a data aggregator module; (ii) associating a preconfigured score range to the calculated motivation score; (iii) collecting activities which were preassigned to the preconfigured score range from the database of interactions data indexer; (iv) retrieving one or more predetermined agent favorite activities for the agent from the database of user preferences; (v) retrieving one or more agent history activities from the database of user preferences, which were previously selected by the agent; (vi) calculating an activity occurrence score for each activity of the collected activities, which were preassigned to the preconfigured score range, by adding the: (a) motivation score; (b) the one or more predetermined agent favorite activities; and (iii) the one or more agent history activities; and (vii) displaying a rated list of recommended activities for the agent, on a display unit, according to the calculated activity occurrence score.

Furthermore, in accordance with some embodiments of the present disclosure, the operating of the machine learning model may include retrieving data of the agent work-shift, from the database of interactions data indexer. The retrieved data may include: (i) sentiment analysis score; (ii) speech analysis score; (iii) customer sentiment change; (iv) performance Key Performance Indicators (KPI) score; and (v) personal traits; Then, the machine learning model may calculate the motivation score according to the retrieved data.

Furthermore, in accordance with some embodiments of the present disclosure, the data aggregator module may receive the (i) sentiment analysis score; (ii) speech analysis score; and (iii) customer sentiment change, from an analytics application.

Furthermore, in accordance with some embodiments of the present disclosure, the data aggregator module may receive the (i) performance Key Performance Indicators (KPI) score; and (ii) personal traits, from a workforce management system.

Furthermore, in accordance with some embodiments of the present disclosure, the data aggregator module may further receive for each previous 'n' interactions of the agent in the agent work-shift, a proficiency level of the agent used to route an interaction compared to proficiency level of the agent required to the interaction; and a communication channel, from an Automatic Call Distributor (ACD) system.

Furthermore, in accordance with some embodiments of the present disclosure, the sentiment analysis score may be calculated by the analytics application, according to (i) physical stress voice; (ii) change in stress voice; and (iii) text analysis-based sentiment which are extracted from voice recordings of previous 'n' interactions of the agent in the agent work-shift and related text thereof, which were converted from the voice recordings of the previous 'n' interactions of the agent in the agent work-shift.

Furthermore, in accordance with some embodiments of the present disclosure, the speech analysis score may be based on: (i) conversation speed; and (ii) conversation volume.

Furthermore, in accordance with some embodiments of the present disclosure, the received customer sentiment change may include: (i) transition from positive to negative or transition from negative to positive during an interaction; (ii) customer feedback for an interaction; (iii) channel switch during the interaction; and (iv) pattern of customer feedback. (i)-(iv) may be received for each previous 'n' interactions of the agent in the agent work-shift.

Furthermore, in accordance with some embodiments of the present disclosure, the performance Key Performance Indicators (KPI) score may be calculated by the workforce management according to: (i) Average Handle Time (AHT); (ii) occupancy rate in the contact center; and (iii) First Call Resolution (FCR) achieved.

Furthermore, in accordance with some embodiments of the present disclosure, the personal traits received from the workforce management system nay be calculated according to each previous 'n' interactions of the agent in the agent work-shift, according to: (i) a proficiency level of the agent used to route an interaction compared to proficiency level of the agent required to the interaction; (ii) level of patience during an interaction; (iii) phone etiquette; (iv) level of resourcefulness; and (v) number of channels multitasking.

Furthermore, in accordance with some embodiments of the present disclosure, the operating of the activities recommendation module may further include associating a weight for each activity of the one or more predetermined agent favorite activities before the calculating of the activity occurrence score, for each predetermined agent favorite activity that is included in the collected activities.

Furthermore, in accordance with some embodiments of the present disclosure, the rated list of recommended activities may have a preconfigured number of activities.

Furthermore, in accordance with some embodiments of the present disclosure, the rated list of recommended activities may be displayed on a display unit, on a preconfigured breaktime of the agent.

Furthermore, in accordance with some embodiments of the present disclosure, after the displaying of a rated list of recommended activities on a display unit, the agent may be enabled to: (i) select an activity from the list of recommended activities; (ii) and a time duration for the selected activity.

Furthermore, in accordance with some embodiments of the present disclosure, upon a start of the selected activity, a timer may be started, and the agent may be asked to select another activity to perform after the time duration of the selected activity is over.

Furthermore, in accordance with some embodiments of the present disclosure, the agent is provided with a list of activities to determine one or more activities as favorite activities. The agent's determined one or more activities as favorite activities may be stored in the database of agents related data.

Furthermore, in accordance with some embodiments of the present disclosure, each selected activity may be stored in the database of agents related data, as an agent history activity.

There is further provided, in accordance with some embodiments of the present disclosure, a computerized-system for an agent, in a contact center.

Furthermore, in accordance with some embodiments of the present disclosure, the computerized-system may include: a database of interactions data indexer; a database of user preferences; a memory to store the plurality of databases and a processor. The processor may be configured to operate an activities recommendation module, for one or more agents in a contact center, during a work-shift of an agent.

Furthermore, in accordance with some embodiments of the present disclosure, the activities recommendation module may be configured to: (i) operate a machine learning model to calculate a motivation score based on data aggregated by a data aggregator module; (ii) associate a preconfigured score range for the calculated motivation score; (iii) collect activities which were preassigned to a preconfigured score range from the database of interactions data indexer; (iv) retrieve one or more predetermined agent favorite activities for an agent from the database of user preferences; (v) retrieve one or more agent history activities from the database of user preferences, which are related to activities which were previously selected by the agent; (vi) calculate an activity occurrence score for each activity of the collected activities, which were preassigned to the preconfigured score range, by adding the: (a) motivation score; (b) the one or more predetermined agent favorite activities; and (c) the one or more agent history activities; and (vii) display a rated list of recommended activities for the agent, on a display unit, according to the calculated occurrence score.

BRIEF DESCRIPTION OF THE DRAWINGS

FIG. 3 schematically illustrates components of a machine learning model to calculate a motivation score, in accordance with some embodiments of the present disclosure;

FIG. 6 is an example of activity occurrence score calculation for moderate motivation score (50%-80% motivation score), in accordance with some embodiments of the present disclosure;

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "proficiency level of the agent" as used herein, refers to an input value that gives an indication as to the level of proficiency that is used to route an incoming interaction, according to the expected complexity of the interaction.

The term "First Call resolution (FCR)" as used herein, refers to a value which indicates if customer's issues have been resolved in the first attempt.

Figure 1:
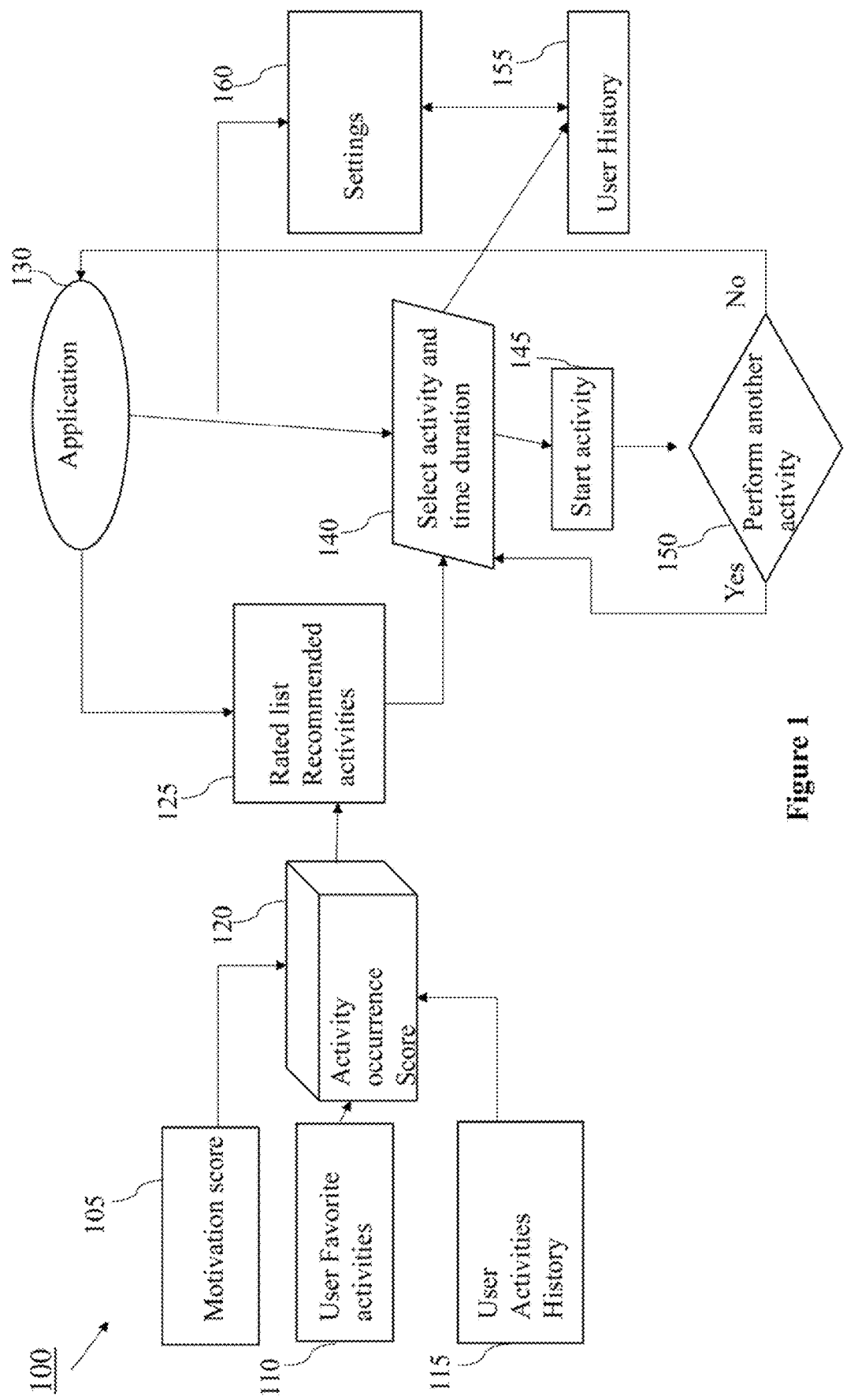
FIG. 1 schematically illustrates a high-level diagram of operating an application for recommending activities for an agent, in accordance with some embodiments of the present disclosure.

FIG. 1 schematically illustrates a high-level diagram of operating an application for recommending activities for an agent 100, in accordance with some embodiments of the present disclosure.

Figure 2A:
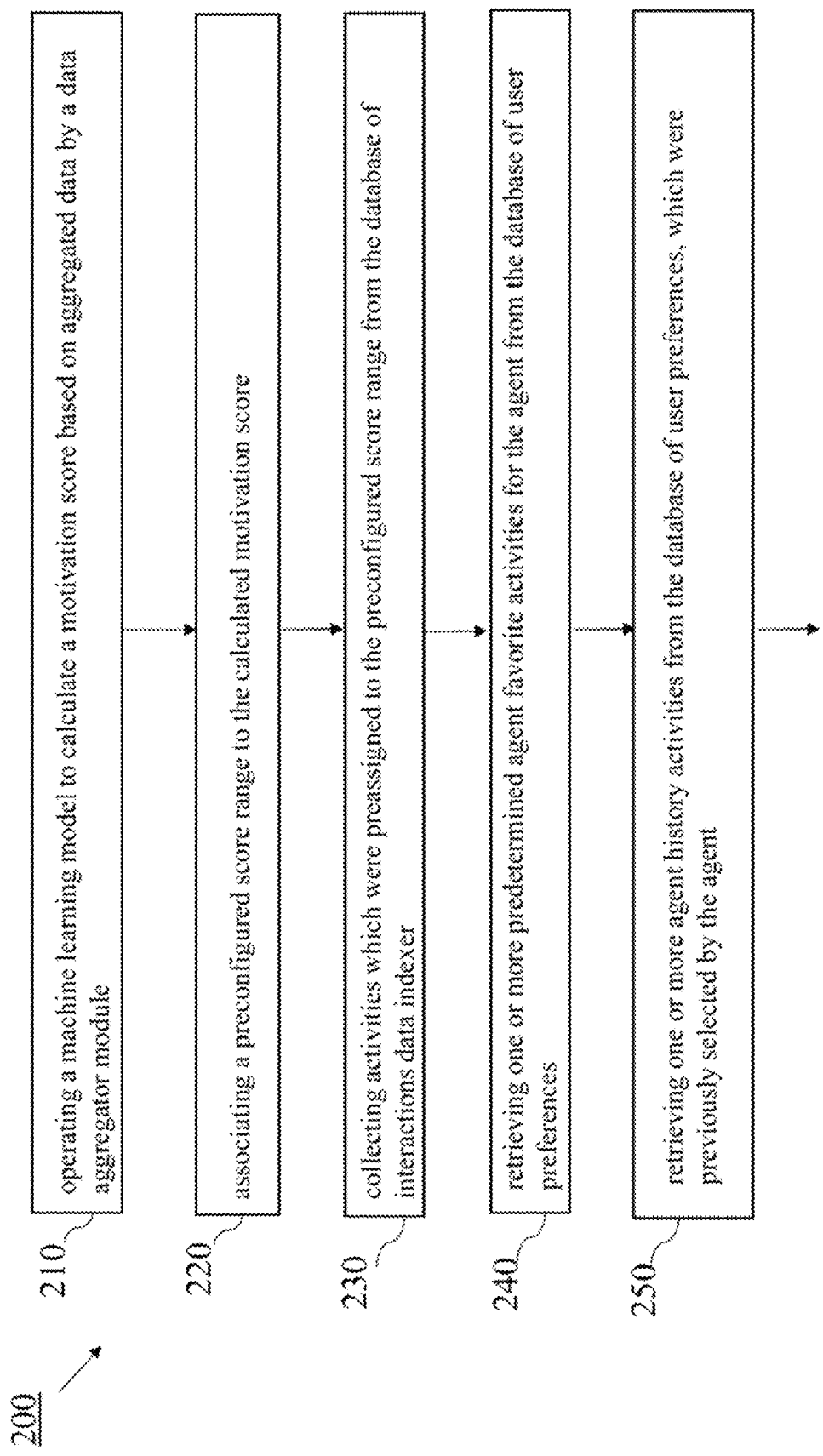
FIGS. 2A-2B are a high-level workflow of activities recommendation module, in accordance with some embodiments of the present disclosure.
Figure 2B:
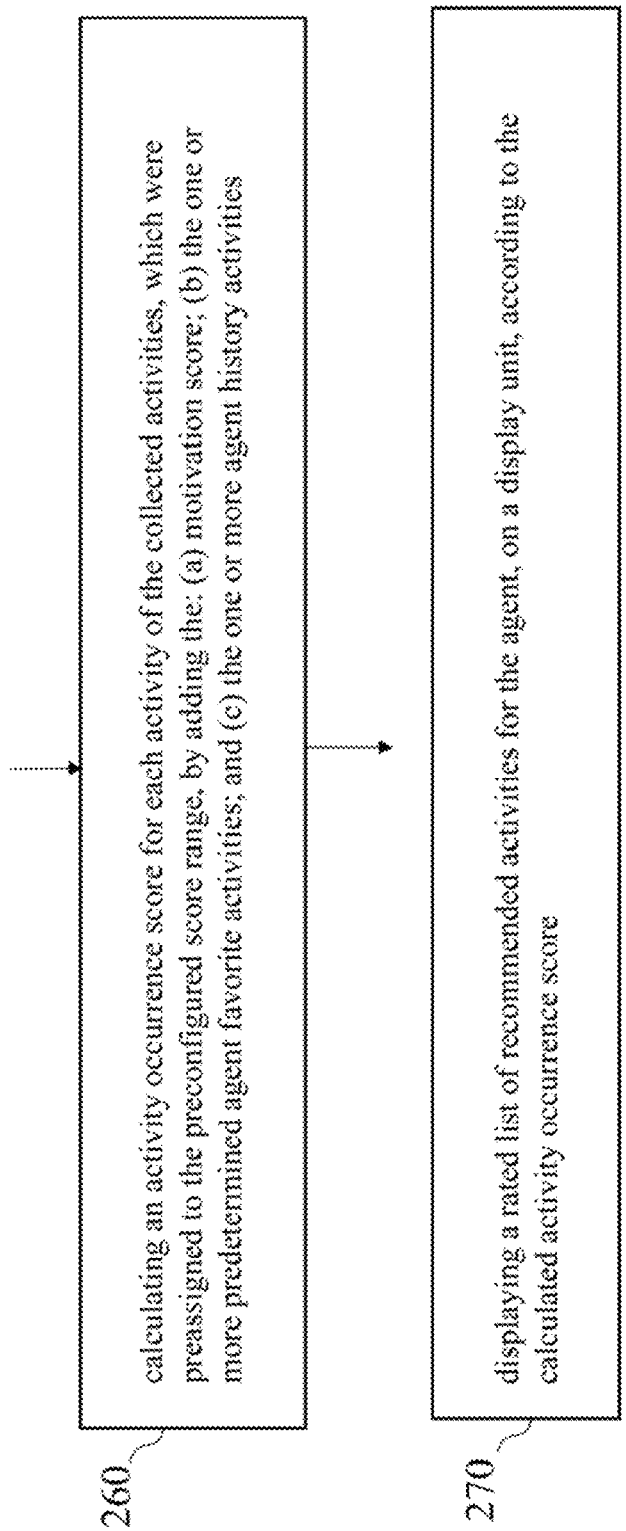

According to some embodiments of the present disclosure, an activities recommendation module, such as activities recommendation module 200 in FIGS. 2A-2B may be operated for one or more agents in a contact center, during a work-shift of an agent. The activities recommendation module, such as activities recommendation module 200 in FIGS. 2A-2B may calculate an activity occurrence score 120 according to: (i) a motivation score 105 of the agent; (ii) user favorites activities 110 and (iii) user history activities 115.

Figure 4:
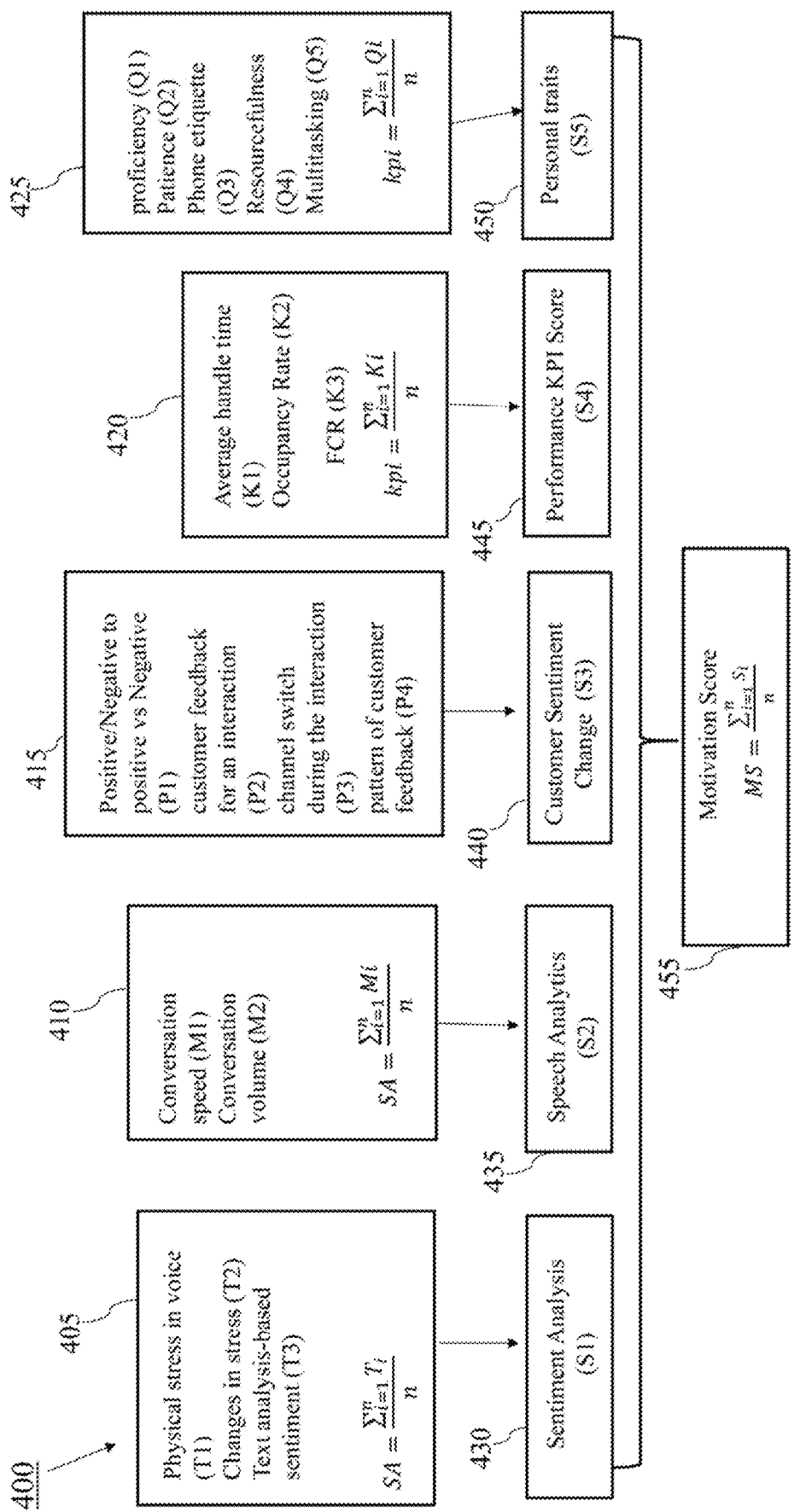
FIG. 4 is a high-level diagram of a machine learning model to calculate a motivation score, in accordance with some embodiments of the present disclosure.

According to some embodiments of the present disclosure, the activities recommendation module, such as activities recommendation module 200 in FIGS. 2A-2B may calculate a motivation score 105 by operating a machine learning model, such as machine learning model 435, in FIG. 4. The machine learning model may calculate the motivation score based on aggregated data by a data aggregator module, such as data aggregator module 425 in FIG. 4.

According to some embodiments of the present disclosure, the activities recommendation module, such as activities recommendation module 200 in FIGS. 2A-2B may associate a preconfigured score range for the calculated motivation score and then may collect activities which were preassigned to a preconfigured score range, as shown in the example of a preconfigured score range for a calculated motivation score, recommended activity categories and recommended activities related to the recommended activity categories 600 in FIG. 6 which will be explained below in detail.

According to some embodiments of the present disclosure, the activities recommendation module, such as activities recommendation module 200 in FIGS. 2A-2B may be operated when an agent starts an application, such as application 130 for recommending activities for breaktime via the agent's computerized device.

According to some embodiments of the present disclosure, the activities recommendation module, such as activities recommendation module 200 in FIGS. 2A-2B may display a rated list of reconmnended activities for the agent, on a display unit (not shown), according to the calculated activity occurrence score 120.

Figure 7:
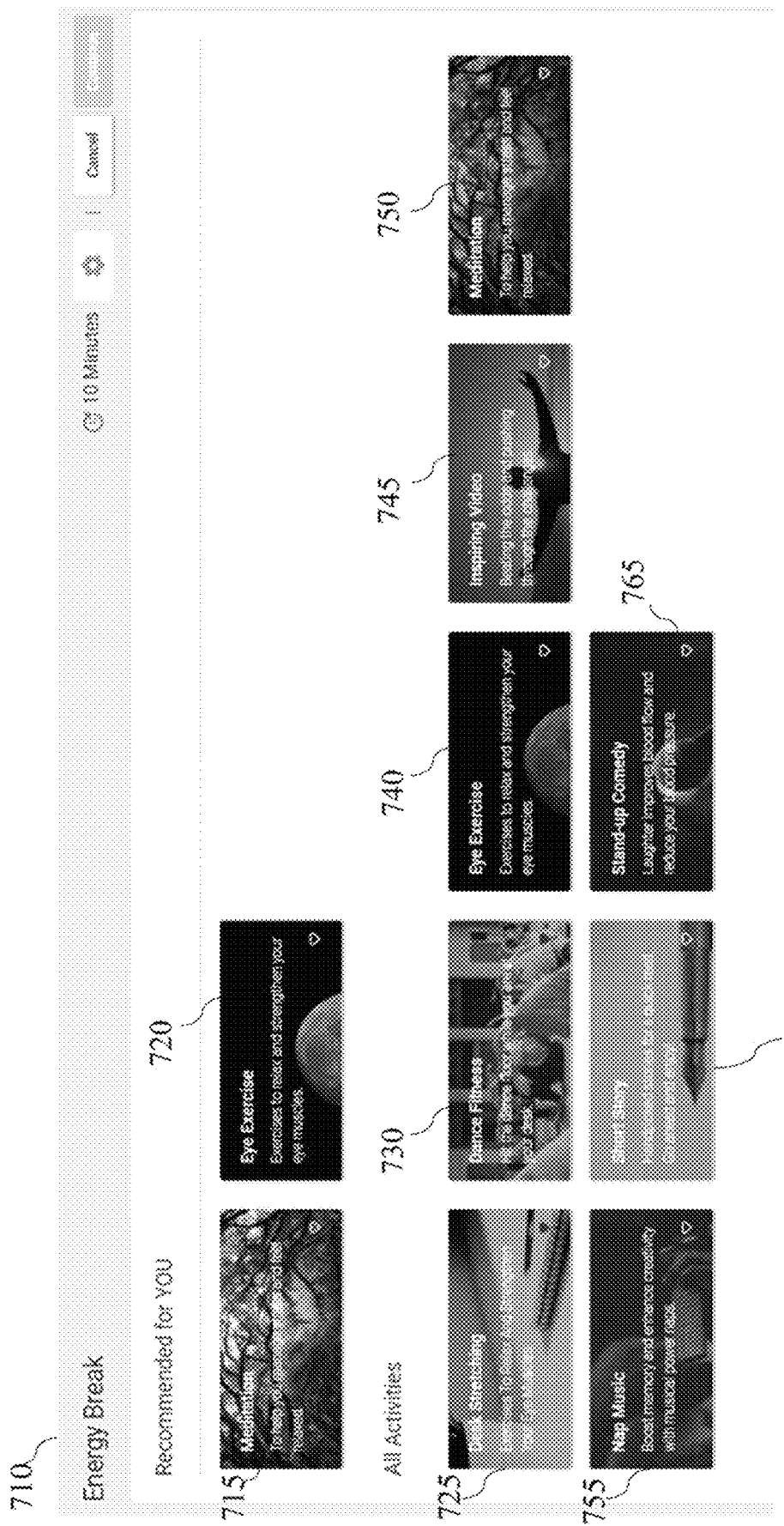
FIG. 7 shows an example of an application screen display of a rated list of recommended activities for the agent, presented on a display unit, according to the calculated occurrence score, in accordance with some embodiments of the present disclosure.

According to some embodiments of the present disclosure, optionally, the application may retrieve all the activities from a database of activities (not shown) and may present on the application screen display of the rated list of recommended activities 125 for the agent, and all activities, on a display unit, according to the calculated activity occurrence score 120, as shown in FIG. 7.

According to some embodiments of the present disclosure, a user, such as an agent in a contact center, may be enabled to select one of the recommended activities and its time duration 140.

According to some embodiments of the present disclosure, the selected activity, may be stored as user history 155 in the database of agents related data.

According to some embodiments of the present disclosure, after the user selects an activity and its time duration, the breaktime activity starts and a timer to measure the breaktime may be operated. The timer may remind the agent to go back to work when the breaktime is over. An agent may be enabled to take one or more breaktime activities by selecting duration of activity based on remaining available breaktime.

According to some embodiments of the present disclosure, after the user selects an activity and its duration, a session of the selected activity may be retrieved and then played by the application 130. The breaktime activity may be meditation, calming music, desk exercises, dance fitness, stretching, yoga and other activities, which may be operated by the application 130 and may be presented on a display unit (not shown) that is associated with the user's computerized device.

According to some embodiments of the present disclosure, when the duration time of the activity is over, the agent may be asked, via the display unit, to select to perform another activity 150.

According to some embodiments of the present disclosure, when the user does not want to perform any other breaktime activity after an activity is over, then the application may open again when the next breaktime is due.

According to some embodiments of the present disclosure, when the user, such as an agent in a contact center, would like to perform another breaktime activity 150, the user may select an activity and time duration 140.

According to some embodiments of the present disclosure, settings element 160 may be operated by application 130 to enable the agents to customize break frequency, break timings and select preferred activities. The agent may be further enabled by settings element 160 to select breaktime activities from a menu of options. For example, meditation, calming music, desk exercises, dance fitness, stretching, yoga and the like.

According to some embodiments of the present disclosure, settings element 160 may enable the agent to set favorite activities from a list of available breaktime activities and to set custom reminders for the agent for activities such as, washing hands etc.

According to some embodiments of the present disclosure, settings element 160 may be operated so that the breaktime activities will not be limited to the activity categories listed and their corresponding activities, but the category list and each category of activities may be extended to other categories and genres as required. User preferences as well as history activities which were selected by the user, may play an important role in the recommended break activities.

According to some embodiments of the present disclosure, settings element 160 may be operated to set reminders for activities, such as hydration and hand wash as well as the activities frequency and timing.

FIGS. 2A-2B are a high-level workflow of activities recommendation module 200, in accordance with some embodiments of the present disclosure.

According to some embodiments of the present disclosure, operation 210 may comprise operating a machine learning model to calculate a motivation score based on aggregated data by a data aggregator module.

According to some embodiments of the present disclosure, operation 220 may comprise associating a preconfigured score range to the calculated motivation score.

According to some embodiments of the present disclosure, operation 230 may comprise collecting activities which were preassigned to the preconfigured score range from the database of interactions data indexer.

According to some embodiments of the present disclosure, operation 240 may comprise retrieving one or more predetermined agent favorite activities for the agent from the database of user preferences.

According to some embodiments of the present disclosure, operation 250 may comprise retrieving one or more agent history activities from the database of user preferences, which were previously selected by the agent.

According to some embodiments of the present disclosure, operation 260 may comprise calculating an activity occurrence score for each activity of the collected activities, which were preassigned to the preconfigured score range, by adding the: (a) motivation score; (b) the one or more predetermined agent favorite activities; and (c) the one or more agent history activities.

According to some embodiments of the present disclosure, operation 270 may comprise displaying a rated list of recommended activities for the agent, on a display unit, according to the calculated activity occurrence score.

FIG. 3 schematically illustrates components of a machine learning model to calculate a motivation score 300, in accordance with some embodiments of the present disclosure.

According to some embodiments of the present disclosure, each interaction between a customer an agent in a contact center may be recorded by recording applications 305 and stored in a database (not shown). The recorded interactions may be forwarded by the recording applications 305 to analytics applications 310.

According to some embodiments of the present disclosure, a data aggregator module 325 may aggregate data from the analytics application 310, a workforce management 320 and an Automatic Call Distributor (ACD) 315.

According to some embodiments of the present disclosure, the data aggregator module 325 may receive (i) sentiment analysis score; (ii) speech analysis score; and (iii) customer sentiment change, from the analytics applications 310.

According to some embodiments of the present disclosure, the data aggregator module 325 may further receive (i) performance Key Performance Indicators (KPI) score; and (ii) personal traits, from the workforce management system 320. The workforce management system may provide the data based on agent assessment scores, which were calculated and stored by the contact center's tool to evaluate agents' performance, behavior and traits.

According to some embodiments of the present disclosure, the data aggregator module 325 may further receive a proficiency level of the agent used to route an interaction compared to proficiency level of the agent required to the interaction and a communication channel, from an Automatic Call Distributor (ACD) system 315. The ACD has this data available and used for distributing incoming interactions based on skill and level of proficiency to attend the customer.

According to some embodiments of the present disclosure, the sentiment analysis score may be calculated by the analytics application, according to (i) physical stress voice; (ii) change in stress voice; and (iii) text analysis-based sentiment, which are extracted from voice recordings of previous 'n' interactions of the agent in the agent work-shift and related text thereof, which were converted from the voice recordings of the previous 'n' interactions of the agent in the agent work-shift. The recordings of previous 'n' interactions of the agent in the agent work-shift may be received by the analytics applications 310, from recording applications 305.

According to some embodiments of the present disclosure, the speech analysis score may be calculated by the analytics applications 310 and may be based on: (i) conversation speed; and (ii) conversation volume, of the previous 'n' interactions of the agent in the agent work-shift. The recordings of previous 'n' interactions of the agent in the agent work-shift may be received by the analytics applications 310, from recording applications 305.

According to some embodiments of the present disclosure, the customer sentiment change may be calculated by the analytics applications 310 and may include (i) transition from positive to negative or transition from negative to positive during an interaction; (ii) customer feedback for an interaction; (iii) channel switch during the interaction; and (iv) pattern of customer feedback. (i)-(iv) may be received for each previous 'n' interactions of the agent in the agent work-shift. The recordings of previous 'n' interactions of the agent in the agent work-shift may be received by the analytics applications 310, from recording applications 305.

According to some embodiments of the present disclosure, the performance Key Performance Indicators (KPI) score may be calculated by the workforce management system 320 according to: (i) Average Handle Time (AHT); (ii) occupancy rate in the contact center; and (iii) First Call Resolution (FCR) achieved. The workforce management system 320 may receive the data for the calculation from analytics applications 310.

According to some embodiments of the present disclosure, the personal traits received from the workforce management system 320 may be calculated according to each previous 'n' interactions of the agent in the agent work-shift, according to: (i) a proficiency level of the agent used to route an interaction compared to proficiency level of the agent required to the interaction; (ii) level of patience during an interaction; (iii) phone etiquette; (iv) level of resourcefulness; and (v) number of channels multitasking.

According to some embodiments of the present disclosure, the data aggregator module 325 may forward the aggregated data to a database, such as interaction data indexer 330. A machine learning model 335 may calculate a motivation score 340 based on the aggregated data by the data aggregator module 325.

According to some embodiments of the present disclosure, operating of the activities recommendation module, such as activities recommendation module 200 in FIGS. 2A-2B, may associate a preconfigured score range for the calculated motivation score 340. Then, the activities recommendation module, such as activities recommendation module 200 in FIGS. 2A-2B, may collecting activities which were preassigned to the preconfigured score range from the database of interactions data indexer 330 and may retrieve one or more predetermined agent favorite activities, i.e., user preferences 350, for the agent from the database of user preferences (not shown).

According to some embodiments of the present disclosure, operating of the activities recommendation module, such as activities recommendation module 200 in FIGS. 2A-2B, may further retrieve one or more agent history activities 355 from the database of user preferences, which were previously selected by the agent during previous breaktimes.

According to some embodiments of the present disclosure, the selection of activities which by the agent may be operated by the agent by a list of activities, may be presented on a display unit, via an application, such as application 130 in FIG. 1, to determine one or more activities as favorite activities, i.e., user preferences 350. The agent's determined one or more activities as favorite activities may be stored in the database of agents related data (not shown).

According to some embodiments of the present disclosure, operating of the activities recommendation module, such as activities recommendation module 200 in FIGS. 2A-2B, may further calculate an activity occurrence score 345 for each activity of the collected activities, which were preassigned to the preconfigured score range, by adding the: (a) motivation score 340; (b) the one or more predetermined agent favorite activities, i.e., user preferences 350; and (c) the one or more agent history activities.

According to some embodiments of the present disclosure, the activities recommendation module, such as activities recommendation module 200 in FIGS. 2A-2B, may display a rated list of recommended activities for the agent, on a display unit, according to the calculated activity occurrence score 345. The rated list of recommended activities may be displayed via an application, such as application 130 in FIG. 1 that communicating over a communication channel with the activities recommendation module, such as activities recommendation module 200 in FIGS. 2A-2B.

According to some embodiments of the present disclosure, operating of the activities recommendation module, such as activities recommendation module 200 in FIGS. 2A-2B, may optionally include associating a weight for each activity of the one or more predetermined agent favorite activities before the calculating of the activity occurrence score 345, such as activity occurrence score 120 in FIG. 1, for each predetermined agent favorite activity that is included in the collected activities.

According to some embodiments of the present disclosure, each selected activity via an application, such as application 130 in FIG. 1, during breaktime, may be stored in the database of agents related data, as an agent history activity.

According to some embodiments of the present disclosure, machine learning model to calculate a motivation score 300 may be built in an iterative process. The operations may include data collection, data preprocessing, training and model evaluation and algorithm selection.

According to some embodiments of the present disclosure, the data collection may include collecting data that is required to train the machine learning model. The data may reside in various applications such as ACD, Quality management, Analytics and Workforce optimization. Historical data may be required to train the machine learning model. The data aggregator module, such as data aggregator module 325, may be utilized to collate this data. The data that is retrieved from the various applications may be labeled to use it to train the machine learning model. The collected data may include: (i) sentiment analysis score; (ii) speech analysis score; (iii) customer sentiment change; (iv) performance Key Performance Indicators (KPI) score; and (v) personal traits.

According to some embodiments of the present disclosure, data preprocessing may include handling missing data, encoding categorical data, splitting data into training and test data and feature scaling. Any missing data for numerical features may be replaced by the average of the data present for that feature. One hot encoding technique may be used for encoding the categorical data where multiple categories are present in a feature. Label encoding to be used to encode the data where only two categories are present including the dependent variable.

According to some embodiments of the present disclosure, 80% of the data may be used as the training set and 20% will be used as the test set. The percentage of test and training data might be varied while training the model.

According to some embodiments of the present disclosure, once the data preprocessing is done the models may be trained with various classification algorithms. These models will be evaluated and compared. The algorithms may be selected from multiple linear regression, logistic regression and support vector machine.

According to some embodiments of the present disclosure, the model evaluation may be one of the crucial steps along with the data preparation. Various methodologies like Root Mean Square Error (RMSE), Adjusted R Square, Mean Absolute Error (MAE) may be used to evaluate the machine learning model prediction. Once the machine learning model is identified then it may be used to predict the motivation score. Typically, machine learning models are serialized (e.g., pickle file) and Application Programming Interface (API)s are exposed to their utilization.

FIG. 4 is a high-level diagram of a machine learning model to calculate a motivation score 400, in accordance with some embodiments of the present disclosure.

According to some embodiments of the present disclosure, a motivation score such as motivation score 340, in FIG. 3 and motivation score 105 in FIG. 1, may be calculated based on (i) sentiment analysis score, according to sentiment analysis such as sentiment analysis 430; (ii) speech analytics score base on speech analytics, such as speech analytics 435; (iii) customer sentiment change, such as customer sentiment change 440; (iv) performance KPI score, such as performance KPI score 445 and (v) personal traits, such as personal traits 450.

According to some embodiments of the present disclosure, a sentiment analysis score may be calculated by a sentiment analysis, such as sentiment analysis 430. The sentiment analysis may be calculated by an analytics application, such as analytics application 310 in FIG. 3, according to several variables 405, e.g., (i) physical stress voice; (ii) change in stress voice; and (iii) text analysis-based sentiment which are extracted from voice recordings of previous 'n' interactions of the agent and related text thereof, which were converted from the voice recordings of the previous 'n' interactions of the agent.

According to some embodiments of the present disclosure, the sentiment analysis score may be calculated according to formula I:

$$SA = \frac{\sum_{i=1}^{n} T_i}{n}$$

Whereby:
T—variable
SA—sentiment analysis
n—number of interactions

According to some embodiments of the present disclosure, a speech analysis score may be calculated by speech analytics, such as sentiment analysis 435, which may be based on variables 410, e.g., (i) conversation speed; and (ii) conversation volume.

According to some embodiments of the present disclosure, the speech analytics 435, may be calculated according to formula II:

$$SA = \frac{\sum_{i=1}^{n} M_i}{n}$$

Whereby:
M—variable
SA—sentiment analytics
n—number of interactions

According to some embodiments of the present disclosure, customer sentiment change 440, may be calculated by the analytics applications 310 in FIG. 3 and may include (i) transition from positive to negative or transition from negative to positive during an interaction; (ii) customer feedback for an interaction; (iii) channel switch during the interaction; and (iv) pattern of customer feedback. (i)-(iv) are received for each previous 'n' interactions of the agent in the agent work-shift.

According to some embodiments of the present disclosure, performance Key Performance Indicator (KPI) score, such as performance KPI score 445, may be calculated by a workforce management system, such as workforce management 320, in FIG. 3, according to several variables 420 e.g., (i) Average Handle Time (AHT); (ii) occupancy rate in the contact center; and (iii) First Call Resolution (FCR) achieved.

According to some embodiments of the present disclosure, performance Key Performance Indicator (KPI) score 445, may be calculated according to formula III:

$$kpi = \frac{\sum_{i=1}^{n} K_i}{n}$$

Whereby:
K—variable
n—number of interactions

According to some embodiments of the present disclosure, personal traits 450 may be received from the workforce management system, such as workforce management 320, in FIG. 3, and may be calculated according to each previous 'n' interactions of the agent in the agent work-shift by several variables 425 e.g., (i) a proficiency level of the agent used to route an interaction compared to proficiency level of the agent required to the interaction; (ii) level of patience during an interaction; (iii) phone etiquette; (iv) level of resourcefulness; and (v) number of channels multitasking.

According to some embodiments of the present disclosure, personal traits 450 may be received from the workforce management system, such as workforce management 320, in FIG. 3 and may be calculated according to formula (iv):

$$PT = \frac{\sum_{i=1}^{n} Q_i}{n}$$

Whereby:
Q—variable
PT—personal traits
n—number of interactions

According to some embodiments of the present disclosure, a machine learning model to calculate a motivation score, such as machine learning model 335 in FIG. 3, may be operated. The machine learning model may include retrieving data of the agent work-shift, from the database of interactions data indexer, such as database of interaction data indexer 330 in FIG. 3.

According to some embodiments of the present disclosure, the retrieved data may include (i) sentiment analysis score, according to sentiment analysis 430; (ii) speech analysis score, according to speech analytics 435; (iii) customer sentiment change 440; (iv) performance Key Performance Indicators (KPI) score 445; and (v) personal traits 450.

According to some embodiments of the present disclosure, the machine learning model, such as machine learning model 335 in FIG. 3, may calculate the motivation score 455, such as motivation score 340 in FIG. 3, according to the retrieved data.

According to some embodiments of the present disclosure, the motivation score may be calculated according to formula V:

$$MS = \frac{\sum_{i=1}^{n} S_i}{n}$$

Whereby:
s—sentiment analysis score, speech analytics score, customer sentiment change, performance KPI score and personal traits
MS—motivation score
n—number of interactions.

Figure 5:
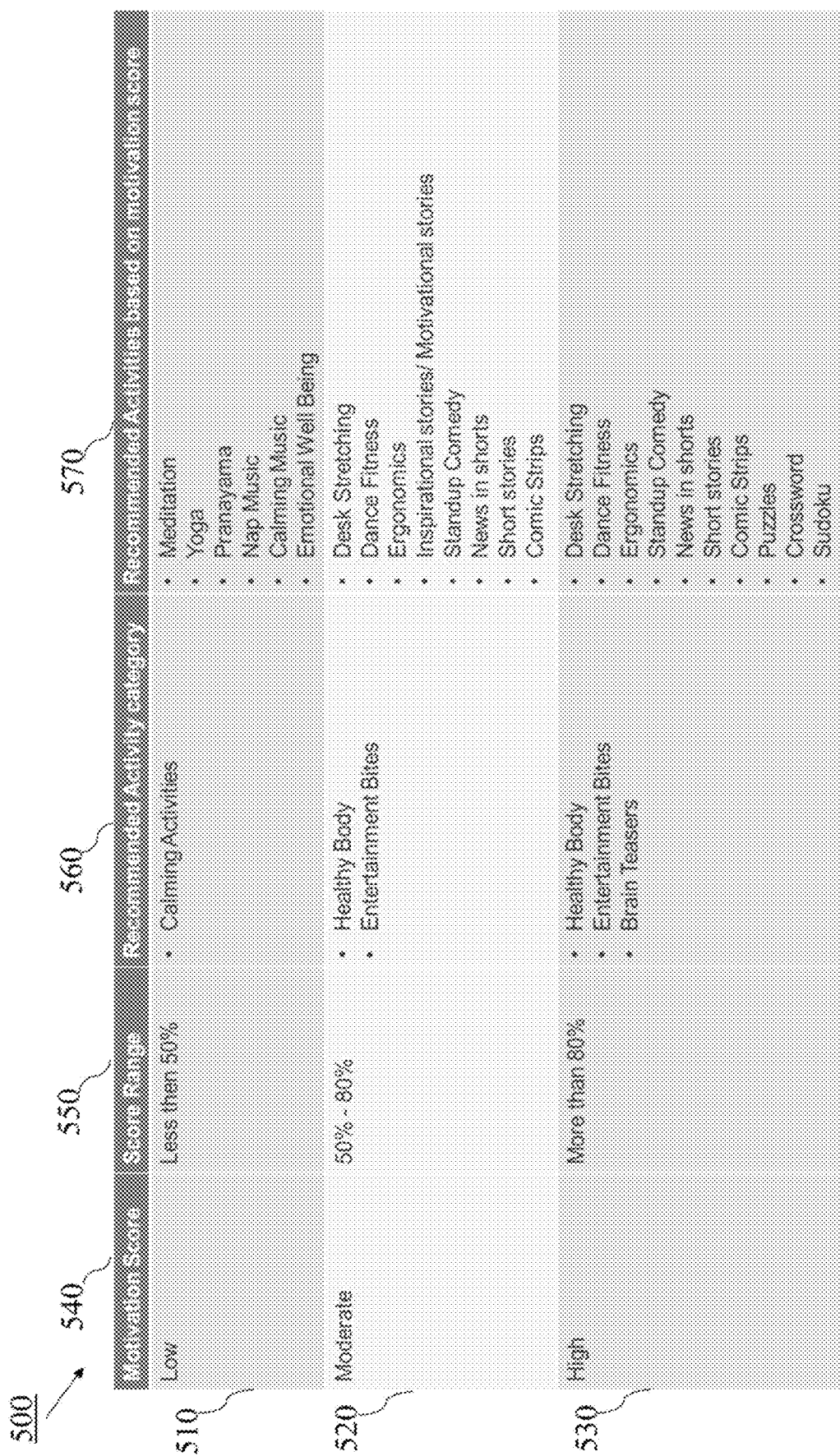
FIG. 5 shows an example of a preconfigured score range for a calculated motivation score, recommended activity categories and activities related to the categories, in accordance with some embodiments of the present disclosure.

FIG. 5 shows an example of a preconfigured score range for a calculated motivation score, recommended activity categories and activities related to the categories 500, in accordance with some embodiments of the present disclosure.

According to some embodiments of the present disclosure, a low motivation score 510 may be in a score range 550 that is less than 50%. The associated recommended activity category 560 which may be assigned may be calming activities and the associated recommended activities based on motivation score 570 may include: Meditation, Yoga, Pranayama, Nap Music, Calming Music, Emotional wellbeing.

According to some embodiments of the present disclosure, a moderate motivation score 520 may be in a score range 550 of 50%-80%. The associated recommended activity category 560 which may be assigned may be Healthy body and Entertainment bites and the associated recommended activities based on motivation score 570 may include Desk stretching, Dance fitness, Ergonomics, Inspirational stories/Motivational stories, Standup comedy, News in shorts, Shorts stories, Comic strips.

According to some embodiments of the present disclosure, a high motivation score 530 may be in a score range more than 80%. The associated recommended activity category 560 which may be assigned may be Healthy body and Entertainment bites and Brain teasers and the associated recommended activities based on motivation score 570 may include Desk stretching, Dance fitness, Ergonomics, Inspirational stories/Motivational stories, Standup comedy, News in shorts, Shorts stories, Comic strips, puzzles, crosswords, sudoku.

FIG. 6 is an example of activity occurrence score calculation 600 for moderate motivation score (50%-80% motivation score), in accordance with some embodiments of the present disclosure.

According to some embodiments of the present disclosure, operating of the activities recommendation module, such as activities recommendation module 200 in FIGS. 2A-2B, may calculate an activity occurrence score, such as activity occurrence score 120 in FIG. 1, and activity occurrence score 345 in FIG. 3, for each activity of collected activities 620, which were preassigned to a preconfigured score range. For example, for moderate motivation score of 50%-80%.

The calculation of activity occurrence score may be operated by adding the: (a) motivation score 630; (b) the one or more predetermined agent favorite activities, such as user favorites 640; and (c) the one or more agent history activities, such as user history 650.

According to some embodiments of the present disclosure, for each activity which was preassigned to the preconfigured score range from a database of interactions data indexer, such as interaction data indexer 330 in FIG. 3, based on the motivation score, such as score range 520 in FIG. 5, e.g., moderate motivation score of 50%-80%, may be calculate an activity occurrence score 660.

According to some embodiments of the present disclosure, the motivation score, such as motivation score 455 in FIG. 4 and such as motivation score 105 in FIG. 1, may be calculated based on (i) sentiment analysis score; (ii) speech analysis score; (iii) customer sentiment change; (iv) performance Key Performance Indicators (KPI) score; and (v) personal traits, and calculated according to formula V shown above.

According to some embodiments of the present disclosure, operating of the activities recommendation module, such as activities recommendation module 200 in FIGS. 2A-2B, may include associating a weight for each activity of the one or more predetermined agent favorite activities before the calculating of the activity occurrence score 600, for each predetermined agent favorite activity that is included in the collected activities. For example, the user favorites activities 640 which were selected by the settings element 160 in FIG. 1, dance fitness, standup comedy and meditation may be assigned a 200% weight and may be multiplied by two for the activity occurrence score calculation.

According to some embodiments of the present disclosure, for example, when user favorites 640 includes the activities dance fitness, standup comedy and mediation and when a weight of 200% is assigned to each one of the activities, and the user has previously selected to practice dance fitness and comic strips these activities may be presented in a rated list of recommended activities for the agent, on a display unit.

FIG. 7 shows an example of an application screen display of a rated list of recommended activities for the agent, presented on a display unit, according to the calculated occurrence score, in accordance with some embodiments of the present disclosure.

According to some embodiments of the present disclosure, a screen display of an energy break 710 may be presented to an agent on a display unit. Activities meditation 715 and eye exercise 720 may be shown on the list of recommended for you. The rated list of recommended activities may be presented according to a calculated activity occurrence score, such as activity occurrence score 120 in FIG. 1, and such as activity occurrence score 345 in FIG. 3.

According to some embodiments of the present disclosure, optionally, the application, such as application 130 in FIG. 1, may retrieve all the activities from a database of activities (not shown) and may present it on the application screen display. For example, desk stretching 725, dance fitness 730, eye exercise 740 inspiring video 745, meditation 750, nap music 755, short story 760 and stand-up comedy 765.

Figure 8:
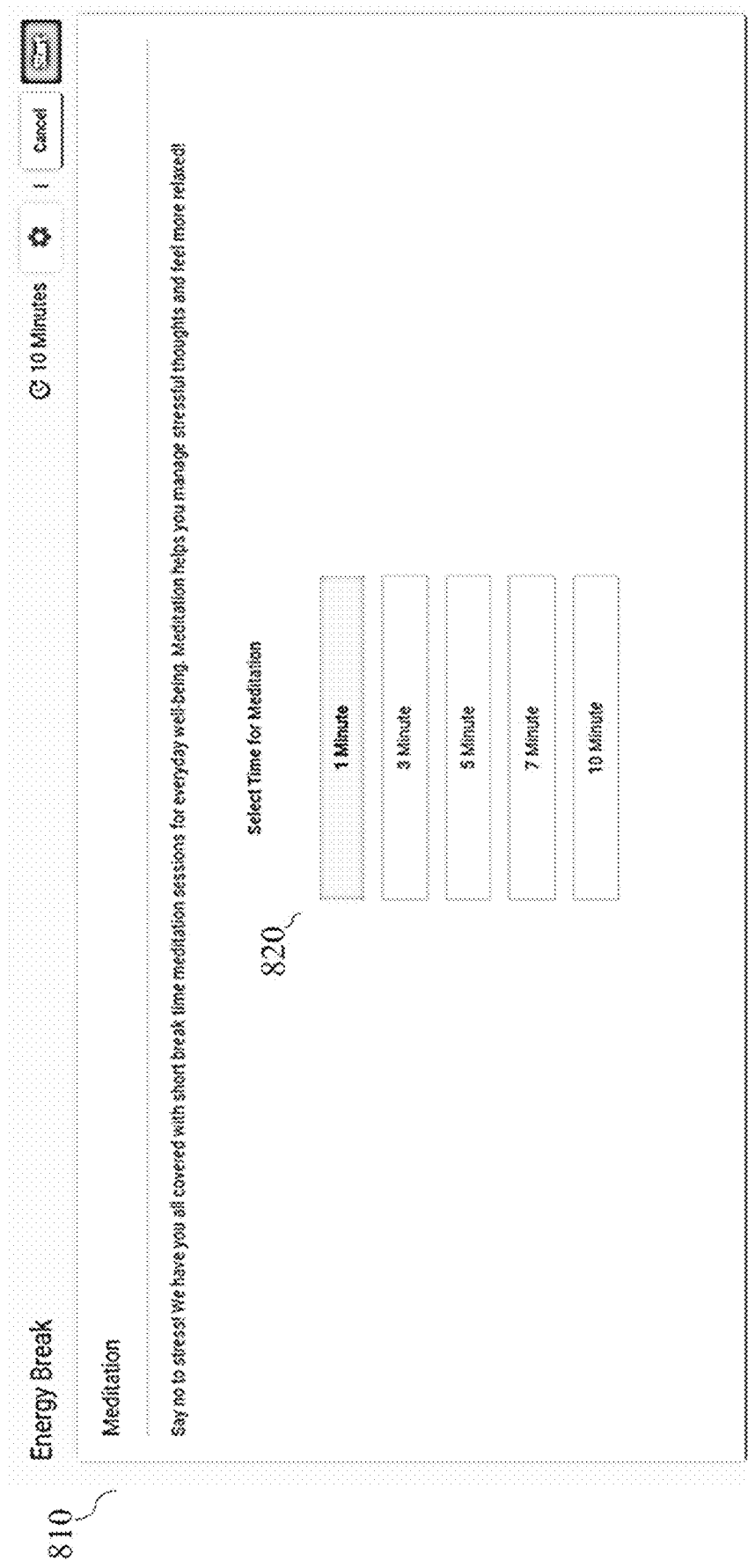
FIG. 8 shows an application screen display for selecting a duration of an activity presented on a display unit, in accordance with some embodiments of the present disclosure.

FIG. 8 shows an application screen display for selecting a duration of an activity presented on a display unit, in accordance with some embodiments of the present disclosure.

According to some embodiments of the present disclosure, after the displaying of a rated list of recommended activities on a display unit, e.g., recommended activities 715 and 720 in FIG. 7, the agent may be enabled to: (i) select an activity from the list of recommended activities; (ii) and a time duration for the selected activity.

According to some embodiments of the present disclosure, for example, the agent may select meditation activity, such as meditation 715 in FIG. 7. For the meditation activity, the agent may be enables to select time duration 820.

According to some embodiments of the present disclosure, the selected time duration may be for example, 1 minute. Other options for time duration of the activity may be 3 minute, 5 minute, 7 minute and 10 minute.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What we claim:

1. A computerized-method for recommending activities as effective energy breaks for an agent during a work-shift, in a contact center, said computerized-method comprising: in a computerized system comprising a processor, a database of interaction data indexer; and a database of user preferences; and a memory to store the plurality of databases, said processor is configured to:
   a. configure an analytics application to calculate: (i) sentiment analysis score: (ii) speech analysis score; and (iii) customer sentiment change, wherein the calculating of the sentiment analysis score comprising:
   converting voice recordings of previous 'n' interactions of the agent in the agent work-shift lo text to extract: (a) physical stress voice: (b) change in stress voice; and (c) text analysis-based sentiment
   b. train a machine learning model by a support vector machine to calculate a motivation score based on aggregated data, by a data aggregator module,
   wherein the aggregated data includes:
   (a) the calculated sentiment analysis score; (b) speech analysis score; (c) customer sentiment change; (d) performance Key Performance Indicators (KPI) score; (e) personal traits; (f) a proficiency level of the agent used to route an interaction compared to proficiency level of the agent required to the interaction for each previous 'n' interactions of the agent in the agent work-shift; and (g) communication channel,
   wherein the proficiency level and the communication channel are received from an Automatic can Distributor (ACD) system,
   wherein the KPI score and the personal traits are received from a workforce management system, and
   wherein the personal traits which are received from the workforce management system are calculated according to each previous 'n' interactions of the agent in the agent work-shift, according to:
   (i) a proficiency level of the agent used to route an interaction compared to proficiency level of the agent required to the interaction; (ii) level of patience during an interaction; (iii) phone etiquette; (iv) level of resourcefulness; and (v) number of channels multitasking, and
   c. operate an activities recommendation module, during the work-shift of the agent said activities recommendation module comprising:
   (i) operating the machine learning model to calculate a motivation score of the agent based on aggregated data of the agent work-shift, that is retrieved from the database of interactions data indexer by the data aggregator module;
   (ii) associating a preconfigured score range to the calculated motivation score;
   (iii) collecting activities which were preassigned to the preconfigured score range from the database of interactions data indexer;
   (iv) retrieving one or more predetermined agent favorite activities for the agent from the database of user preferences;
   (v) retrieving one or more agent history activities from the database of user preferences, which were previously selected by the agent;
   (vi) calculating an activity occurrence score for each activity of the collected activities, which were preassigned to the preconfigured score range, by adding the: (a) calculated motivation score; (b) the one or more predetermined agent favorite activities; and (c) the one or more agent history activities;

(vii) selecting, by the agent: (a) an activity from a list of icons of recommended activities, created based on the calculated activity occurrence score of the agent, by clicking on an icon that represents the activity; (b) time duration for the selected activity by clicking on a time duration icon displaying the time duration of the selected activity; and (c) displaying a timer-icon displaying a remaining time duration of the selected time duration of the selected activity; and (viii) upon start of the selected activity, starting a timer based on the selected time duration, and when the selected time duration of the selected activity is over: (a) selecting, by the agent, another activity, by clicking another icon of the another activity from the list of icons of recommended activities; and (b) updating the timer-icon by displaying a remaining time duration of the selected another activity.

2. The computerized-method of claim 1, wherein the aggregated data of the agent work-shift, that is retrieved from the database of interactions data indexer includes: (i) sentiment analysis score; (ii) speech analysis score; (iii) customer sentiment change; (iv) performance Key Performance Indicators (KPI) score; and (v) personal traits; and calculating the motivation score according to the retrieved data.

3. The computerized-method of claim 1, wherein the speech analysis score is based on: (i) conversation speed; and (ii) conversation volume.

4. The computerized-method of claim 1, wherein the received customer sentiment change includes: (i) transition from positive to negative or transition from negative to positive during an interaction; (ii) customer feedback for an interaction; (ii) channel switch during the interaction; and (iv) pattern of customer feedback, wherein (i)-(iv) are received for each previous 'n' interactions of the agent in the agent work-shift.

5. The computerized-method of claim 1, wherein the performance KPI score is calculated by the workforce management according to: (i) Average Handle Time (AHT); (ii) occupancy rate in the contact center; and (iii) First Call Resolution (FCR) achieved.

6. The computerized-method of claim 1, wherein the operating of the activities recommendation module further includes associating a weight for each activity of the one or more predetermined agent favorite activities before the calculating of the activity occurrence score, for each predetermined agent favorite activity that is included in the collected activities.

7. The computerized-method of claim 1, wherein the rated list of recommended activities is having a preconfigured number of activities.

8. The computerized-method of claim 1, wherein the rated list of recommended activities is displayed on a display unit, on a preconfigured breaktime of the agent.

9. The computerized-method of claim 1, wherein the agent is provided with a list of activities to determine one or more activities as favorite activities, wherein the agent's determined one or more activities as favorite activities are stored in the database of agents related data.

10. The computerized-method of claim 1, wherein each selected activity is stored in the database of agents related data, as an agent history activity.

11. The computerized-method of claim 1, wherein the machine learning model is evaluated by at least one methodology of: (i) Root Mean Square Error (RMSE); (ii) Adjusted R Square; and (iii) Mean Absolute Error (MAE).

12. The computerized-method of claim 1, wherein the sentiment analysis score is calculated according to formula I:

$$SA = \frac{\sum_{i=1}^{n} T_i}{n}$$

Whereby:
T is a variable,
SA is the sentiment analysis score, and
n is a number of interactions.

13. The computerized-method of claim 1, wherein the speech analysis score is calculated according to formula II:

$$SA = \frac{\sum_{i=1}^{n} M_i}{n}$$

Whereby:
M is a variable,
SA is the sentiment analytics score, and
n is a number of interactions.

14. The computerized-method of claim 1, wherein the customer sentiment change is calculated based on following parameters:
(i) transition from positive to negative or transition from negative to positive during an interaction; (ii) customer feedback for an interaction; (iii) channel switch during the interaction; and (iv) pattern of customer feedback, wherein parameters (i)-(iv) are received for each previous 'n' interactions of the agent in the agent work-shift.

15. The computerized-method of claim 5, wherein the performance Key Performance Indicator (KPI) score is calculated by the workforce management system according to formula III $$kpi = \frac{\sum_{i=1}^{n} K_i}{n}$$

Whereby:
K is a variable, and
n is a number of interactions.

16. The computerized-method of claim 1, wherein the personal traits are calculated by the workforce management system according to formula (iv):

$$PT = \frac{\sum_{i=1}^{n} Q_i}{n}$$

Whereby:
Q is a variable,
PT are personal traits, and
n is a number of interactions.

17. The computerized-method of claim 2, wherein the motivation score is calculated according to formula V:

$$MS = \frac{\sum_{i=1}^{n} S_i}{n}$$

Whereby:
s is one of: sentiment analysis score, speech analytics score, customer sentiment change, performance KPI score and personal traits,
MS is the motivation score, and
n is a number of interactions.

18. A computerized-system for recommending activities as effective energy breaks for an agent during a work-shift, in a contact center, the computerized-system comprising:
a database of interactions data indexer:
  a database of user preferences;
  a memory to store the plurality of databases; and
  a processor, said processor is configured to:
  a. configure an analytics application to calculate: (i) sentiment analysis score; (ii) speech analysis score; and (iii) customer sentiment change,
  wherein the calculating of the sentiment analysis score comprising:
  converting voice recordings of previous 'n' interactions of the agent in the agent work-shift to text to extract: (a) physical stress voice; (b) change in stress voice; and (c) text analysis-based sentiment,
  b. train a machine learning model by a support vector machine to calculate a motivation score based on aggregated data by a data aggregation module,
  wherein the aggregated data includes:
  (a) the calculated sentiment analysis score; (b) speech analysis score; (c) customer sentiment change; (d) performance Key Performance Indicators (KPI) score; and (e) personal traits; (f) a proficiency level of the agent used to route an interaction compared to proficiency level of the agent required to the interaction for each previous 'n' interactions of the agent in the agent work-shift; and (g) communication channel,
  wherein the proficiency level and the communication channel are received from an Automatic Call Distributor (ACD) system,
  wherein the KPI score and the personal traits are received from a workforce management system; and
  wherein the personal traits which are received from the workforce management system are calculated according to each previous 'n' interactions of the agent in the agent work-shift, according to:
  (i) a proficiency level of the agent used to route an interaction compared to proficiency level of the agent required to the interaction; (ii) level of patience during an interaction; (iii) phone etiquette: (iv) level of resourcefulness; and (v) number of channels multitasking, and
  c. operate an activities recommendation module, during the work-shift of the agent, said activities recommendation module comprising:
  (i) operating the machine learning model to calculate a motivation score of the agent based on aggregated data of the agent work-shift, that is retrieved from the database of interactions data indexer, by the data aggregator module;
  (ii) associating a preconfigured score range to the calculated motivation score ;
  (iii) collecting activities which were preassigned to a preconfigured score range from the database of interactions data indexer;
  (iv) retrieving one or more predetermined agent favorite activities for an agent from the database of user preferences;
  (v) retrieving one or more agent history activities from the database of user preferences, which are related to activities which were previously selected by the agent;
  (vi) calculating an activity occurrence score for each activity of the collected activities, which were preassigned to the preconfigured score range, by adding the: (a) calculated motivation score; (b) the one or more predetermined agent favorite activities; and (c) the one or more agent history activities; and
  (vii) selecting, by the agent: (a) an activity from a list of icons of recommended activities, created based on the calculated activity occurrence score of the agent, by clicking on an icon that represents the activity; (b) time duration for the selected activity by clicking on a a time duration icon displaying the time duration of the selected activity; and (c) displaying a timer-icon displaying a remaining time duration of the selected time duration of the selected activity; and
  (viii) upon start of the selected activity, starting a timer based on the selected time duration, and when the selected time duration of the selected activity is over:
  (a) selecting, by the agent, another activity, by clicking another icon of the another activity from the list of icons of recommended activities; and
  (b) updating the timer-icon by displaying a remaining time duration of the selected another activity.

\* \* \* \* \*